US007664772B2

(12) United States Patent
Edelmann et al.

(10) Patent No.: US 7,664,772 B2
(45) Date of Patent: Feb. 16, 2010

(54) METHOD AND SYSTEM FOR RECORD ASSOCIATION MANAGEMENT

(75) Inventors: Stefan Edelmann, St. Ingbert (DE); Markus Urbanek, Dortmund (DE)

(73) Assignee: SAP AG, Walldorf (DE)

( * ) Notice: Subject to any disclaimer, the term of this patent is extended or adjusted under 35 U.S.C. 154(b) by 1307 days.

(21) Appl. No.: 10/740,632

(22) Filed: Dec. 22, 2003

(65) Prior Publication Data

US 2005/0138058 A1    Jun. 23, 2005

(51) Int. Cl.
*G06F 17/00* (2006.01)
(52) U.S. Cl. .................................................. 707/102
(58) Field of Classification Search .................. 705/1, 705/28; 707/102, 101, 104.1
See application file for complete search history.

(56) References Cited

U.S. PATENT DOCUMENTS

| 5,712,989 | A | * | 1/1998 | Johnson et al. ............... 705/28 |
| 7,103,608 | B1 | * | 9/2006 | Ozbutun et al. ............. 707/102 |
| 7,171,427 | B2 | * | 1/2007 | Witkowski et al. ........ 707/104.1 |
| 2003/0101194 | A1 | * | 5/2003 | Rys et al. ..................... 707/101 |

* cited by examiner

*Primary Examiner*—Hung T Vy
(74) *Attorney, Agent, or Firm*—Kenyon & Kenyon LLP

(57) ABSTRACT

Embodiments of the present invention relate to forming a network of associations among records of a computer database. The records may relate to logistical operations, and the associations may reflect a status of the logistical operations. According to embodiments, values representing quantities of goods bought, sold and transferred pursuant to the logistical operations may be assigned to the associations to indicate initial conditions and changes in the status of the logistical operations as they go forward.

15 Claims, 7 Drawing Sheets

METHOD AND SYSTEM FOR RECORD ASSOCIATION MANAGEMENT

FIELD OF THE INVENTION

Embodiments of the present invention relate to software for management of electronic records.

BACKGROUND INFORMATION

Business operations typically involve such activities as the purchasing and sale of goods, storing and shipping of the goods, billing for the goods, and related activities. Activities of this kind, and planning and organization related to the activities may be referred to as "business logistics" or simply "logistics." Software used in facilitating logistics operations may accordingly be referred to as "logistics software."

Each step in a logistical process may result in the creation or modification of an associated record using logistics software. A simple example of steps of a logistical process are the steps of receiving a customer order, scheduling delivery of the order, and updating inventory. Each of these steps might generate corresponding records, such as, respectively, a sales order record, an outbound delivery record, and a goods issue record. A sales order record may record such things as the customer's name, and the type and number of goods ordered. An outbound delivery record might include such information as a delivery location and time, a shipper, and so on. A goods issue record might record, for example, how many items were shipped, and when, so that the seller's inventory records could be suitably updated. A parallel process might occur on the purchasing end of the transaction. That is, the purchaser of the goods might generate a purchase order record corresponding to the sales order record generated by the seller, an inbound delivery record corresponding to the outbound delivery record, and a goods received record corresponding to the goods issue record.

A trader or trading company conducts a business that involves both the purchasing and selling of goods, possibly in a speculative fashion. That is, a trader typically does not himself produce a good, store it and ship it. Instead, a trader may sell goods without necessarily having the goods on hand, or buy goods without necessarily having a buyer for the goods. An example of a trader or trading company is one that trades in oil. A trader might purchase a quantity of oil, then seek a buyer for the oil. Or, a trader might sell a quantity of oil, then seek a seller to buy the oil from. The trader might further need to arrange for the receipt or delivery of the oil. Pursuant to such activities, a trader typically uses logistics software in his business.

Challenges faced in the trading business include the need to quickly and efficiently move goods between buyers and sellers. If, for example, a trader has ordered goods, he must find a buyer for them quickly or cover the expense of storing them himself. On the other hand, if a trader has sold goods and does not have them on hand, he must quickly find a seller or risk not being able to meet the sales contract. Further, a trader must know the status of his goods at all times so that he can ensure that they are allocated in the correct quantities to the correct customers. For example, errors such as selling the same goods to two different customers must be prevented. Given the numerous records that can be generated in connection with logistical operations as described above and the complications that can ensue therefrom, there is a need for software to manage the records in such a way that the challenges presented to the trading business are met.

SUMMARY OF THE INVENTION

Embodiments of the present invention relate to forming a network of associations among records of a computer database. The records may relate to logistical operations, and the associations may reflect a status of the logistical operations. According to embodiments, values representing, for example, quantities of goods bought, sold, received and delivered pursuant to the logistical operations may be assigned to the associations to indicate initial conditions and changes in the status of the logistical operations as they go forward.

The network of associations may, in particular, help to address the needs of the trading business, as discussed above. For example, the associations may enable a trader to stay abreast of the status of goods by maintaining up-to-date information concerning the relative allocation of the goods between a "sales side" of logistical operations and a "purchase side" of the operations. Thus, information concerning, for example, what goods a trader must find buyers for and what goods a trader must find sellers for is readily available to the trader. Further, the network of associations may, for example, prevent such errors as selling the same goods twice, by causing an associated quantity of goods to be unavailable for further sale.

DETAILED DESCRIPTION

Embodiments of the present invention relate to computer software for forming and maintaining associations between records stored electronically in a computer database. The associations may represent a relationship between the records. The associations may be expressed in terms of quantities indicated by numerical values. The quantities may be adjusted to indicate events affecting the associated records, such as the formation of new, related records corresponding to logistical operations.

Figure 1:
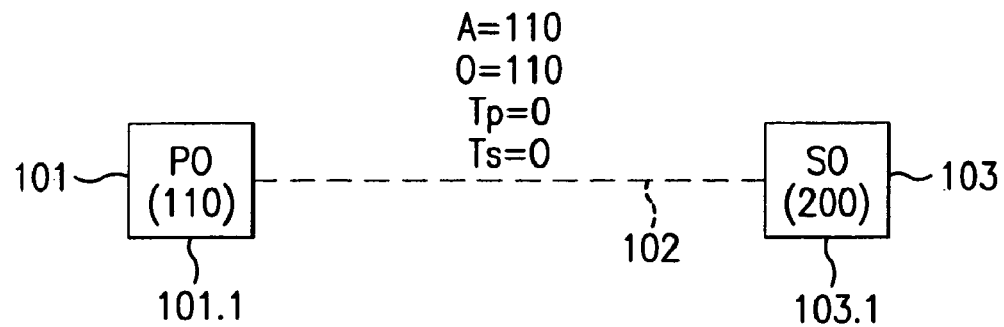
FIG. 1 shows an example of an association between two records.

FIG. 1 shows an example of an association between two records 101 and 103; the association is represented by a broken line 102 connecting the two records. According to embodiments, the records may be created in support of, and represent, logistical operations. An association between records, more specifically, may be a connection or relation between a sales-side record (e.g., a sales order or an outbound delivery), and a purchase-side record (e.g., a purchase order or an inbound delivery). Associated sales-side and purchase-side records may be referred to as "association partners." For example, record 101 may represent a purchase order (PO) and record 103 may represent a corresponding sales order (SO);

record 101 is an association partner of record 103 and vice versa. An initial association may be formed, for example, via a user interface for performing logistics operations. That is, a person creating the purchase order may perform a series of operations via the user interface to form a logical link between the purchase order and the sales order. The link, for example, could be represented by an entry or entries in tables read from a database and operated on in a memory of a computer.

Information concerning the association may be expressed in terms of an association quantity, which may be represented by a numerical value. There may be multiple parameters describing the association, each expressed in terms of a quantity and each representing a distinct piece of information concerning the association. According to embodiments, the parameters may include an active or current association quantity A, an original association quantity O, a quantity Tp transferred from a purchase side of a preceding association, and a quantity Ts transferred from a sales side of a preceding association.

A status of and adjustments to an association may be indicated in the parameters describing the association. For example, in FIG. 1, initial conditions of the association 102 are shown. The A parameter may change over the course of time, but because FIG. 1 represents initial conditions, the A parameter has the same value as does the O parameter. The value of 110 for parameter A could indicate, for example, that 110 out of a quantity of 200 of some good whose sale is documented by sales order 103 is allocated to purchase order 101. Parameters Tp and Ts specify quantities transferred from preceding associations to "follow-on" records that may document follow-on steps such as delivery or receipt of an order. Because in FIG. 1 no preceding association exists, parameters Tp and Ts are set equal to 0 (zero). Parameters A and O could be adjusted up or down by, for example, manual input via a user interface, or automatically due to some event indicating a change in status of operations represented by the records, such as the creation of a new record documenting delivery of an order or part of an order, a deletion or cancellation of a record, or some other event. Parameters Tp and Ts may be adjusted automatically in accordance with transfers or re-allocations of quantities between records.

Each record 101, 103 may have a record quantity, initially assigned to the record upon its creation, for example, by a user pursuant to a transaction. Portions of the record quantity may be transferred to follow-on records. SO 103, for example, has a record quantity 103.1 equal to 200; PO 101 has a record quantity 101.1 equal to 110. As portions of the record quantity are transferred to follow-on records, it may be determined what portion of the record quantity remains untransferred. The untransferred quantity, more specifically, may be defined as the record quantity less the sum of all quantities transferred to follow-on records. An unassociated quantity, defined as the untransferred quantity less the sum of all associated quantities, may also be determined. This unassociated quantity may be used as the basis for decisions by a user, such as a trader, concerning, for example, whether a buyer or seller needs to be found, whether goods remain to be delivered, and the like. Further, if a quantity is associated, this may be used as an indication that the quantity is not available for other transactions. This may prevent duplicate sales of the same goods, for example.

Figure 2:
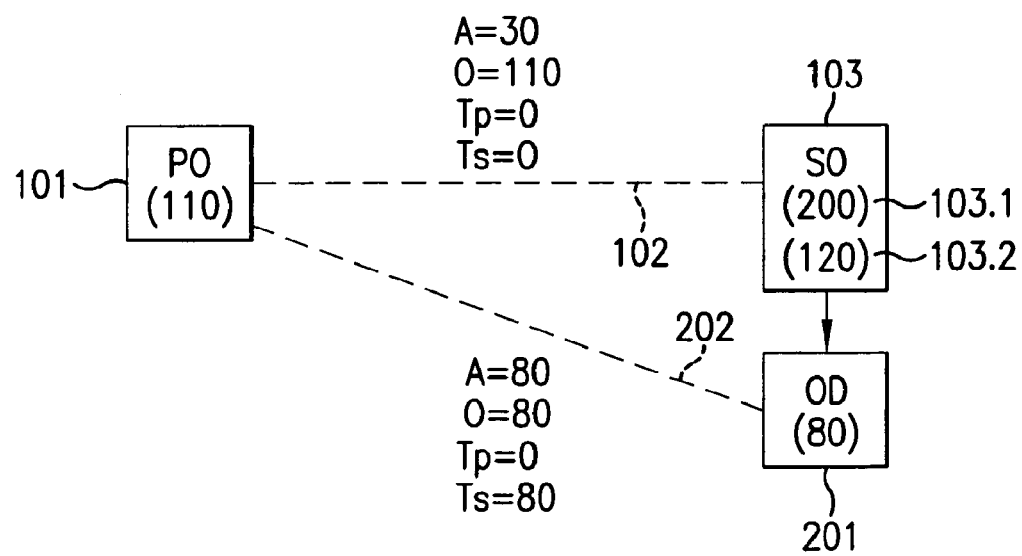
FIG. 2 shows an example of three records and their associations.

Multiple associations may be formed between records, as shown in FIG. 2. In FIG. 2, record 101 is associated with both record 103 and with a record 201 via association 202. As further shown in FIG. 2, a parent-child relationship may exist between records. Such a parent-child relationship is indicated by a directed line, where the line points from the parent to the child. Thus, record 201 is a child of record 103. Follow-on records are child records.

As illustrated in the example of FIG. 2, association quantities may be adjusted to reflect events as logistics operations go forward. Parameter A, for example, could be adjusted to show a redistribution of association quantities as new records are created and associated with existing records. The redistribution could be useful in determining a status of the logistics operation, such as what operations have been performed and what operations remain to be carried out. For example, record 201 may represent an event calling for an adjustment of association quantities. Record 201 could represent the creation of an outbound delivery (OD) record documenting a delivery of a quantity of 80 out of the quantity of 110 allocated to purchase order 101 in sales order 103. As illustrated in FIG. 2, parameter A for association 102 has been adjusted accordingly: i.e., reduced by 80 to assume a value of 30. This could be an indication that, though a quantity of 80 of the quantity of 110 allocated to purchase order 101 have been or will be delivered, 30 remain to be delivered.

Another way of viewing the foregoing adjustment is to view it as a transfer of association quantities: i.e., a transfer of 80 from parameter A of association 102 to parameter A of association 202. Association 202 is described by parameters A=80, O=80, Tp=0 and Ts=80. In association 202, the Ts parameter has a non-zero value because a quantity (80) is transferred to a follow-on record (record 201) from a sales-side record (SO 103) of a preceding association (association 102). Parent record 103, accordingly, now has an untransferred quantity 103.2 equal to 120 and an unassociated quantity equal to 90 (untransferred quantity 120 less the quantity, 30, associated with PO 101). If a follow-on (child) record for PO 101 had been created and a quantity transferred from PO 101 to the follow-on record, parameter Tp would have had a non-zero value. The Ts and Tp parameters may be used to reset association quantities to their previous values for events such as cancellations of follow-on steps like order deliveries or receipts.

Figure 3:
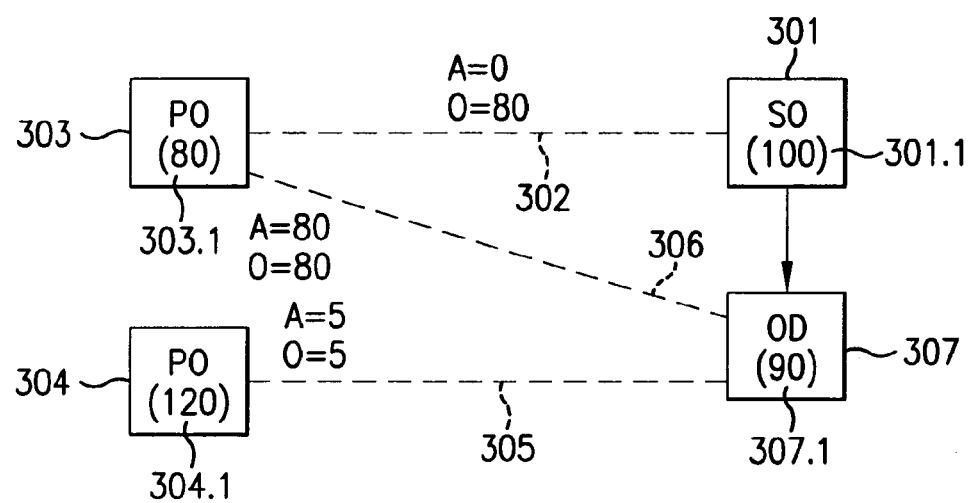
FIG. 3 shows an example of a network of associations according to embodiments of the present invention.

Associations may be created automatically and corresponding parameters assigned thereto based on previous or pre-existing associations. For example, in FIG. 2 association 102 is a previous or pre-existing association, and when child record OD 201 is created, association 202 between OD 201 and PO 101 may be automatically formed by software according to embodiments of the present invention, based on the pre-existing association 102 of the parent record 103. Based on the quantity transferred to follow-on record 201 from parent record 103, the parameters for newly formed associated 202 may be automatically assigned. More generally, associations with the association partners of a parent record may automatically be formed for a child of the parent record FIG. 3 shows another example of a network of associations and their parameters. In FIG. 3, an SO 301 having a record quantity 301.1 of 100 is associated by an association 302 with a PO 303 having a record quantity 303.1 of 80. Association 302 is described by parameters A=0 and O=80.

SO 301 has a child record, a follow-on record 307 which is an OD having a record quantity 307.1 of 90. OD 307 is associated by an association 306 with PO 303. Association 306 is described by parameters A=80 and O=80.

OD 307 is further associated by an association 305 with a PO 304 having a record quantity 304.1 of 120. Association 305 is described by parameters A=5 and O=5.

PO 303 is an example of a fully associated record. Information concerning whether a record is fully associated may be used as a basis for decisions by a user. For example, the fact that PO 303 is fully associated could tell a trader that his purchase order (for example) is filled and that he can take whatever measures might be appropriate in view of this. If record 303 had been a sales order, on the other hand, the fact that it was fully associated would have prevented any of the record quantity from being sold in error to another party.

An example of operations that could be performed automatically by computer-executable instructions according to the present invention include operations to determine whether a record is fully associated. According to embodiments, the original quantities assigned to associations (parameter O) could be used to determine whether a record is fully associated. More specifically, a record could be determined to be fully associated if the sum of the O parameters of its respective associations is equal to or greater than the record quantity. This sum may need to be corrected for quantities transferred to associations with follow-on records. To perform this correction, it may be checked whether the parent of a child record associated with the particular record in question (the record for which it is being determined whether the record is fully associated) is also associated with the particular record. If so, a quantity transferred to the child record may be subtracted from the sum of O parameters of the particular record's associations.

For example, in FIG. 3 PO 303 is associated to SO 301 and to OD 307. The sum of the parameters O is 160 (80 for each association). But because the association between PO 303 and OD 307 was created by transferring the association quantity from the association between PO 303 and SO 301, to avoid double-counting this transferred quantity, the transferred quantity (parameter Tp=80 of association between PO 303 and OD 307) may be subtracted from the overall sum, resulting in a corrected sum of 80.

Because the record quantity of PO 303 (80) is equal to this corrected sum, this record is fully associated.

In FIG. 3, (recalling that unassociated quantities are calculated as the untransferred quantity less the sum of all associated quantities), unassociated quantities are: 10 for SO 301 (because 90 of the record quantity of 100 are transferred to OD 307 and A=0 for association 302); 0 (zero) for PO 303 since it is fully associated; 115 for PO 304 (because only 5 of the record quantity of 120 are associated); and 5 for OD 307 (because only 85 of the record quantity of 90 are associated). The foregoing information could be useful by showing a trader, for example, that a quantity of 10 of whatever good is represented by SO 301 need to be bought by the trader, that a quantity of 115 of whatever good is represented by PO 304 need to be sold by the trader, and that 5 additional items could be included a delivery represented by OD 307.

The association quantities and corresponding unassociated quantities described above could be automatically calculated by computer-executable instructions according to embodiments of the present invention, based on initial values assigned to the association quantities by, for example, a user operating a user interface, and based on subsequent adjustments and events. The computer-executable instructions could further generate displays on a display device to display information relating to the associations to a user, store the information electronically on machine-readable medium such as magnetic disk, or print the information.

Figure 4A:
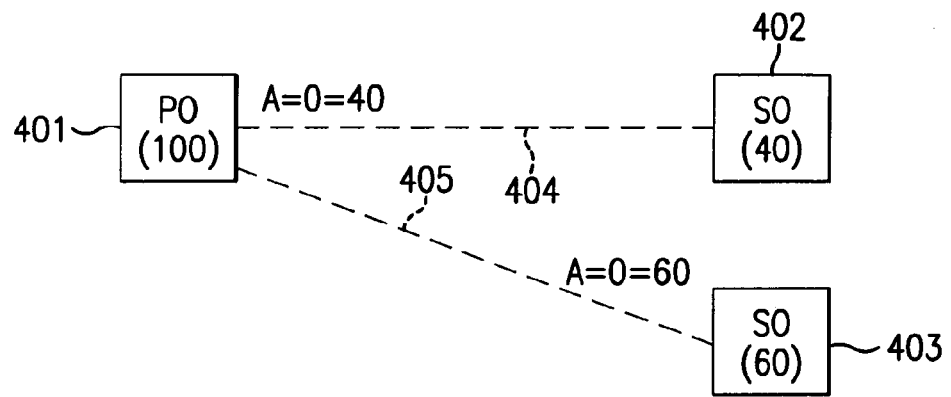
FIGS. 4A and 4B show another example of a possible configuration of records and their associations according to embodiments of the present invention.
Figure 4B:
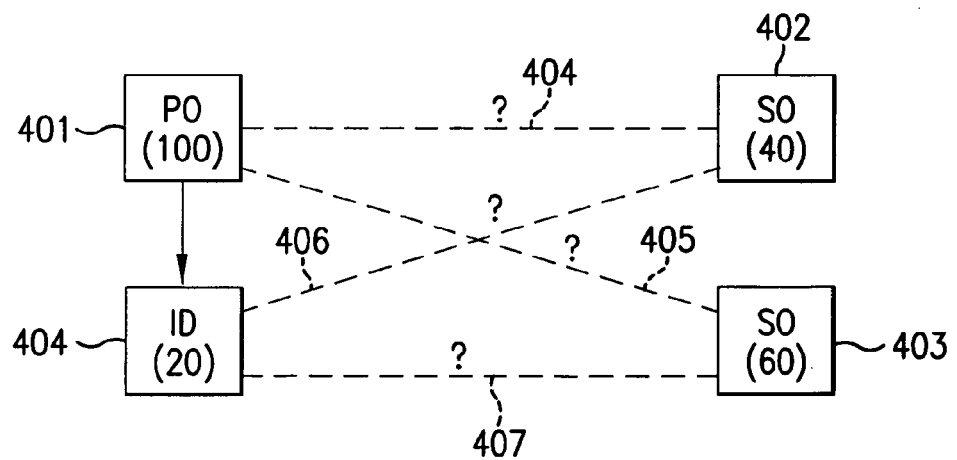

As described above, new associations may be formed between records based on pre-existing associations, and association quantities may be automatically assigned to the newly formed associations. How association quantities should be assigned, however, may not always be as straightforward as in earlier examples. FIGS. 4A and 4B illustrate an example of another, more complex configuration of associations than heretofore shown that can be formed according to embodiments of the present invention, and that may introduce ambiguity into the question of how association quantities should be assigned. In FIG. 4A there is an association 404 between a purchase-side record, a PO 401 having a record quantity of 100, and a sales-side record 402, an SO having a record quantity of 40. For association 404, A=O=40. There is also an association 405 between PO 401 and another sales-side record, an SO 403 having a record quantity of 60. For association 405, A=O=60.

Now assume that a follow-on record to PO 401, an ID 404 is created. A quantity of 20 is transferred from PO 401 to provide a record quantity of 20 for ID 404. Referring now to FIG. 4B, according to embodiments of the present invention, two new associations may be automatically created, based on the pre-existing associations 404 and 405: an association 406 between ID 404 and SO 402, and an association 407 between ID 404 and SO 403. In contrast to preceding examples, where there was only one association partner for a parent in a parent-child relationship, in FIG. 4B there are two association partners for the parent, and consequently, two association partners for the child. This situation creates ambiguity with respect to assigning association quantities to the newly formed associations.

The ambiguity is created at least in part because many combinations of association quantity assignments are possible that would still preserve consistency, where consistency may be determined based on selected criteria. The criteria may include, but are not limited to: (1) the quantities assigned to a record's associations cannot be greater than the unassociated quantity of the record (which at the creation of the record is equal to the record quantity); (2) the associated quantity of a record cannot be greater than its untransferred quantity; and (3) the associated quantity of a record cannot be greater than the quantity that can be transferred from pre-existing associations. Thus, referring to the example of FIGS. 4A and 4B, according to criterion (1), because record 404 has a record quantity of 20, only a quantity of 20 may be distributed among the newly formed associations 406 and 407. However, there are many possible combinations of values that will satisfy criterion (1). For example, association 406 could be assigned A=O=20 and SO 403 could remain fully associated with PO 401. Alternatively, association 406 could be assigned A=O=5 and association 407 could be assigned A=O=15; and so on. Criteria (2) and (3) may be similarly satisfied by various combinations of values.

Thus, according to embodiments of the present invention, when a record has multiple association partners and a follow-on of that record is created, association quantities may be automatically assigned to the newly formed associations resulting from the creation of the follow-on record according to an arbitrary distribution rule or policy. The automatically-formed assignments could be subsequently modified by a user.

According to embodiments, the distribution rule may be a proportional distribution rule. An example of a process applying a proportional distribution rule is discussed in the following, with reference to FIGS. 5A-5D.

Figure 5A:
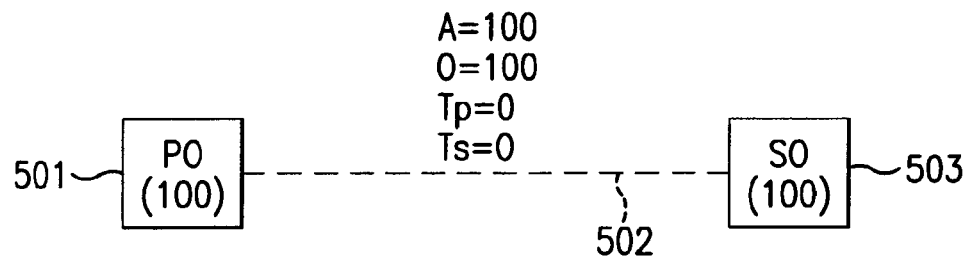
FIGS. 5A-5D show an example of a re-distribution of association quantities among associations according to embodiments of the present invention.

In FIG. 5A, a PO 501 is initially associated by an association 502 with an SO 503. Both PO 501 and SO 503 have a record quantity of 100. The association 502 is described by the parameters A=100, O=100, Ts=0 and Tp=0.

Figure 5B:
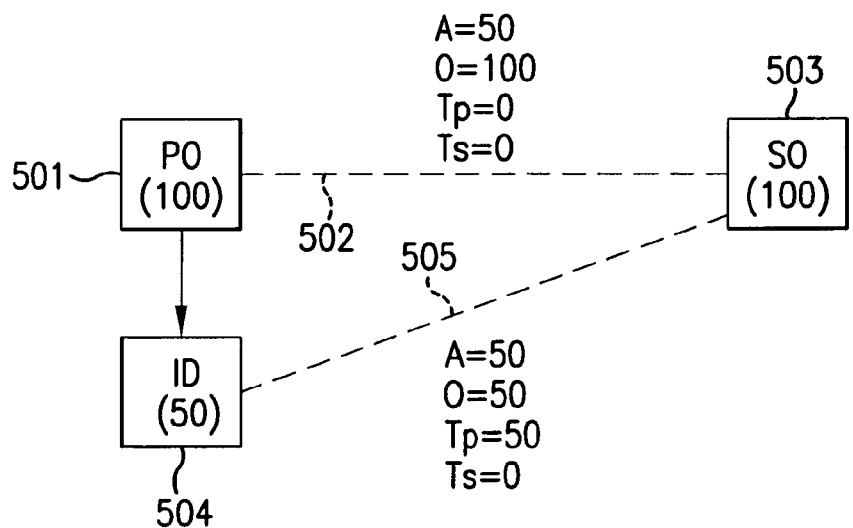

Referring to FIG. 5B, in a follow-on step, an ID record 504 is created from the PO 501. Assume that the ID 504 is assigned a record quantity of 50 (that is, a quantity of 50 is transferred from the PO 501). An association 505 may be automatically created and assigned association quantities.

Here, the assignment is straightforward since PO 501 has only one association partner, SO 503: the quantity transferred from the parent PO is assigned to A, O and Tp of the newly formed association. Association 502 is adjusted accordingly: A=50, O=100, Ts=0 and Tp=0.

Figure 5C:
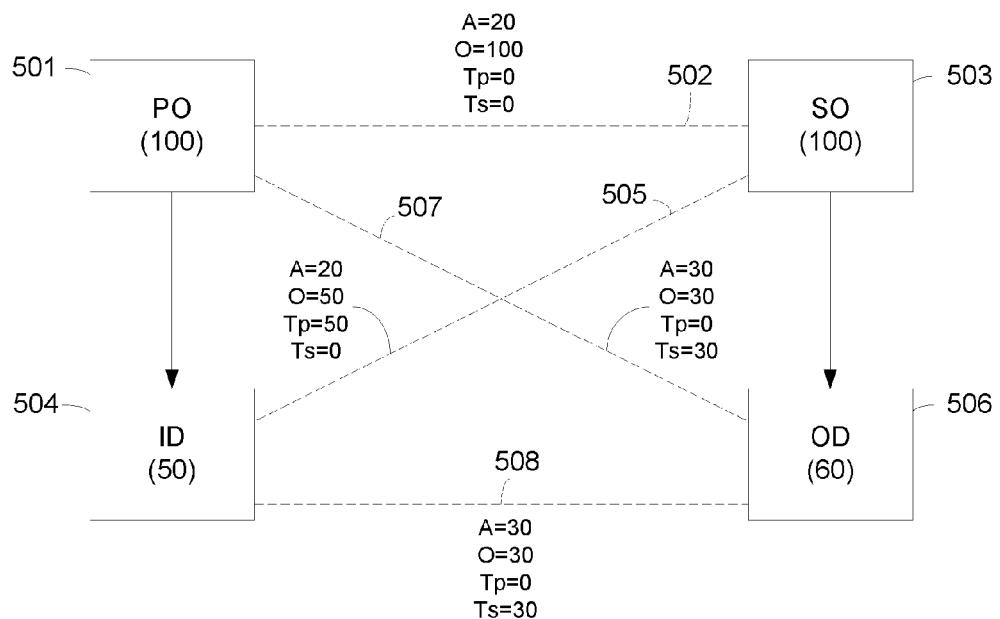
Figure 5D:
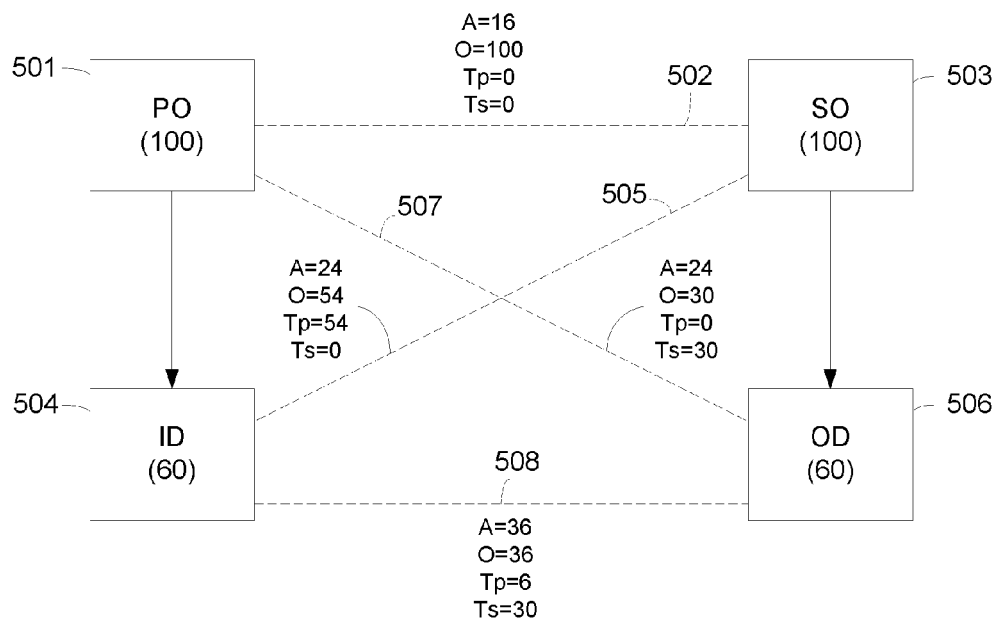

Referring to FIG. 5C, subsequently, in another follow-on step, another follow-on document, OD 506, is created from the SO 503, and a quantity of 60 is transferred to OD 506 from its parent SO 503. Consequently, new associations 507 and 508 are formed, and the ambiguous situation with respect to the assignment of association quantities discussed above is created. Thus, according to embodiments of the present invention, a distribution rule may be applied to automatically assign association quantities. The distribution rule may be a proportional distribution rule.

According to embodiments, in an application of such a proportional distribution rule, a proportioning factor may be applied to the previous association quantities. Let the proportioning factor be denoted $F(i)$, where $F(i)=A(i)/$(the sum of $A(i)$ for all association partners), and $A(i)$=the value of parameter A for the ith association between a parent record and its association partners. Referring to FIG. 5B, SO 503 has two association partners, PO 501 and ID 504. Let $A(1)$ correspond to association 502, and let $A(2)$ correspond to association 505. Thus, $F(1)=A(1)/(A(1)+A(2))=50/(50+50)=\frac{1}{2}$, and $F(2)=A(2)/(A(1)+A(2))=50/(50+50)=\frac{1}{2}$.

The factor $F(i)$ may be applied to the quantity transferred from the parent record to the newly added child record (here, OD 506), and the result may be applied as an adjustment to the pre-existing association quantities, and to assign quantities to the newly formed associations. Thus, in FIG. 5C: adjustment to $A(1)=F(1)\times60$ (the quantity transferred from SO 503 to OD 506)=$\frac{1}{2}\times60=30$; adjustment to $A(2)=F(2)\times60=30$. Applying these results to the pre-existing quantities, the adjusted quantity $A(1)=20$ (i.e., the previous quantity of 50, less the computed adjustment quantity of 30) is obtained for association 502. Similarly, the adjusted quantity $A(2)=20$ is obtained for pre-existing association 505. For the new associations 507 and 508, the computed adjustment quantities may form the initial values for A, O, Tp and Ts. Thus, for association 507, A=O=30, Tp=0 and Ts=30. For association 508, A=O=30, Tp=0 and Ts=30.

If a record quantity of an existing record is changed in a network as shown in FIG. 5C (as opposed to creating a new record and thereby forming new associations), the association quantities may be automatically adjusted by a process along the lines described above. For example, in FIG. 5D, the record quantity of ID 504 has increased by 10 with respect to the record quantity of ID 504 in FIG. 5C (i.e., the record quantity changed from 50 to 60). A proportional distribution rule along the lines described earlier may be automatically applied to propagate this change among the pre-existing associations. A factor $F(i)$ may be computed as above for each parent's associations. PO 501 has two association partners: SO 503 and OD 506. Hence, $A(1)=20$, $A(2)=30$; $F(1)=20/(20+30)=\frac{2}{5}$, $F(2)=30/(20+30)=\frac{3}{5}$. The factor $F(i)$ may be applied to the amount of the change (here, 10) and the result may be used to adjust association quantities. Accordingly, in FIG. 5C parameter A for association 502 has been reduced by 4 (i.e., $\frac{2}{5}\times10$), and parameter A for association 507 has been reduced by 6 (i.e., $\frac{3}{5}\times10$). Symmetrically, parameter A for association 505 has been increased by 4, and parameter A for association 508 has been increased by 6.

Association quantities could be similarly adjusted by application of a proportional distribution rule when records are deleted or record quantities reduced. Moreover, as noted earlier, the quantities automatically assigned to associations by a distribution rule as described above could be manually overridden by a user.

Figure 6:
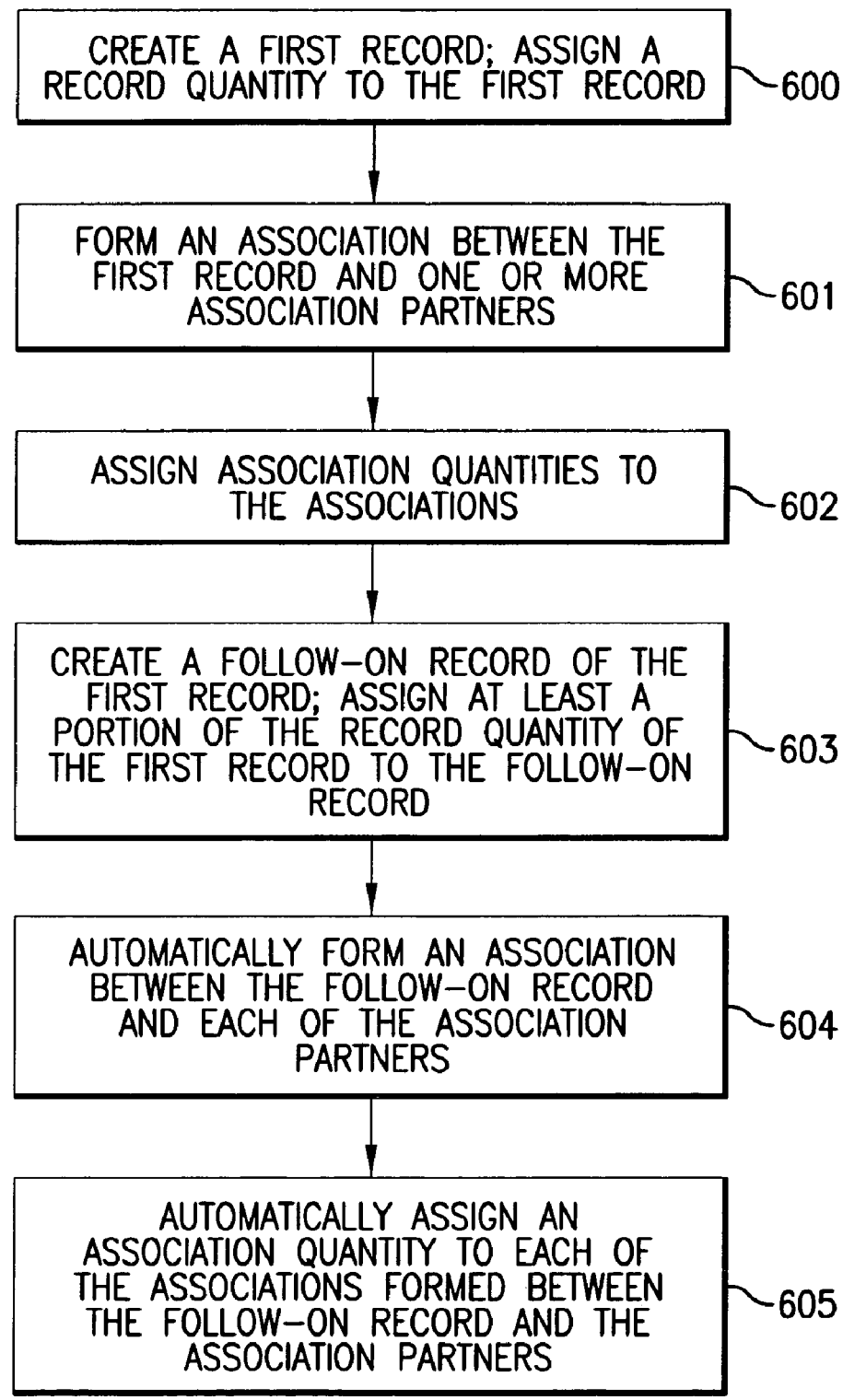
FIG. 6 shows a process flow according to embodiments of the present invention.

FIG. 6 shows a process flow according to embodiments of the present invention. As shown in block 600, the process may comprise creating a first record such as a purchase-side or sales-side record. A record quantity may be assigned to the first record.

The process may further comprise forming an association with one or more association partners, as shown in block 601. If the first record is a purchase-side record, the association partner or partners may be sales-side records. On the other hand, if the first record is a sales-side record, the association partner or partners may be purchase-side records. Association quantities (parameters A and O) may be assigned to the association or associations, as shown in block 602.

As shown in block 603, the process may further comprise creating a follow-on or child record of the first record, and transferring at least a portion of the record quantity of the first record to the follow-on record. As shown in block 604, an association between the follow-on record and an association partner of the first record may be automatically formed, and an association quantity automatically assigned thereto. If the first record has multiple association partners, associations between the follow-on record and each of the association partners may be automatically formed. As shown in block 605, association quantities may be automatically assigned to the newly formed associations. In embodiments, the association quantities may be assigned according to a distribution rule. The distribution rule may be a proportional distribution rule.

Figure 7:
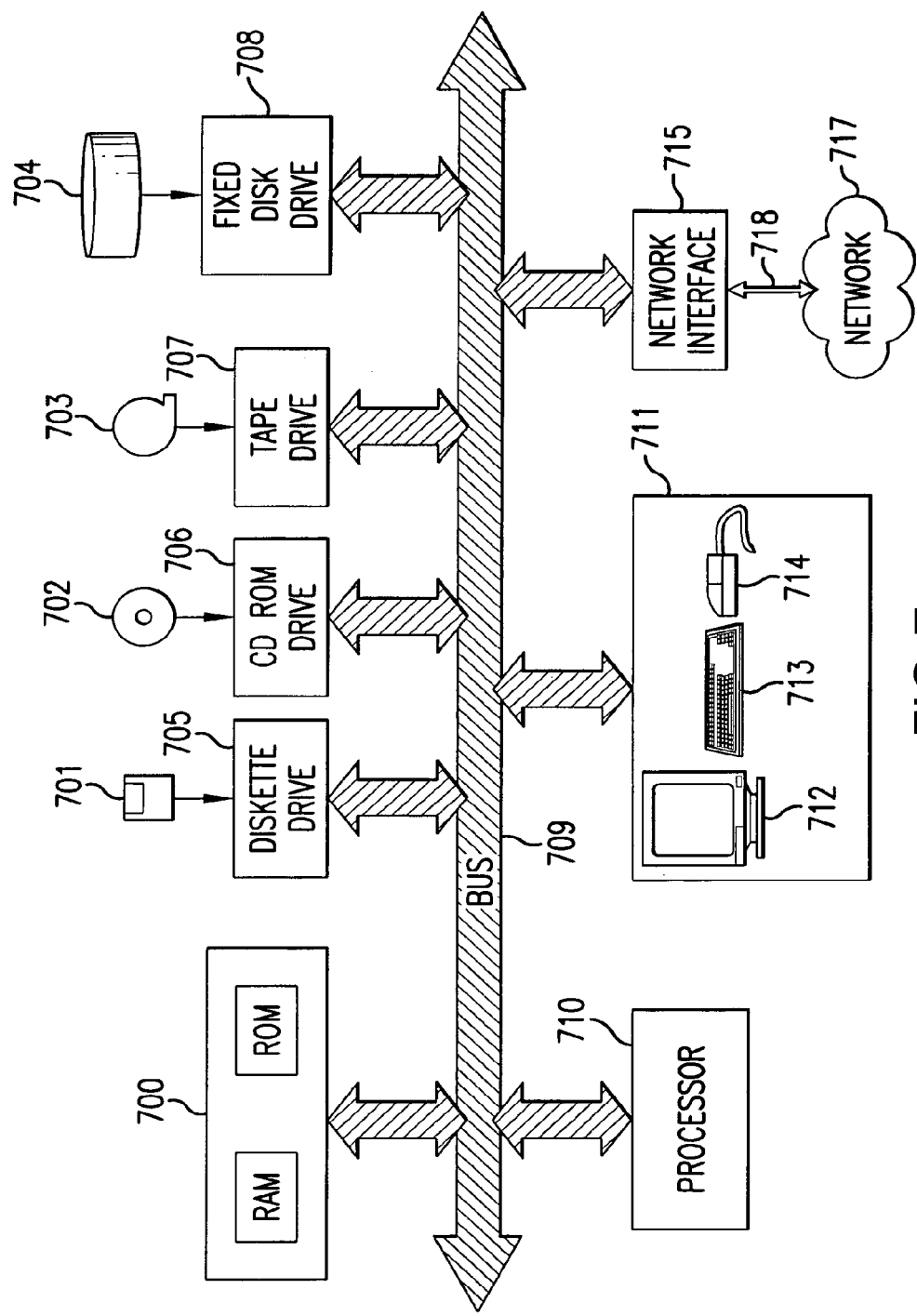
FIG. 7 shows a computer system for implementing embodiments of the present invention.

FIG. 7 shows a high-level representation of a computer system for implementing embodiments of the present invention, such as might be realized by a variety of known and commercially available hardware and software elements. The system may comprise a memory 700 including ROM and RAM, processor 710 and user interface 711 comprising a display device 712, keyboard 713 and mouse 714. Elements may communicate via a system bus 709. The system may further comprise a network 717 connected by a network medium 718 and network interface 715.

A computer program or collection of programs comprising computer-executable instructions according to embodiments of the present invention may be stored and transported on computer-usable media such as diskette 701, CD-ROM 702, magnetic tape 703 and fixed disk 704. The computer instructions may be retrieved from the computer-usable media 701-704 using their respective drives 705-708 into memory 700, and executed by a processor 710. The functionality disclosed hereinabove for performing the embodiments may find specific implementations in a variety of forms, which are considered to be within the abilities of a programmer of ordinary skill in the art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of managing a computer database, comprising:

storing, by a database system, a first record in the computer database representing a first transaction and having a supply quantity associated therewith;

storing, by the database system, a second record in the computer database representing a second transaction and having a consumption quantity associated therewith;

forming, by the database system, a first association link record storing a first association quantity representing a portion of the supply quantity from the first record to be assigned to a first portion of the consumption quantity of the second record; and during processing of the second record:

creating, by the database system, a third record in the computer database representing a second portion of the consumption quantity that has been processed by a third transaction, creating, by the database system, a second association link record storing a second association quantity representing a portion of the first association quantity to be assigned to the third record and representing whether the portion was assigned from the supply quantity or the consumption quantity, and adjusting, by the database system, the first association link record to represent an original first association quantity and a current first association quantity after the assignment to the third record.

2. The method of claim 1, wherein the first association link record includes sub-records representing original first association quantity, current first association quantity, transfer from supply side quantity, and transfer from consumption side quantity.

3. The method of claim 1, wherein the adjusting comprises reducing, by the database system, the first association quantity by the quantity assigned to the third record.

4. The method of claim 1, wherein the third record is a child record of the second record.

5. The method of claim 1, wherein the third record is a child record of the first record.

6. A database system comprising:

a storage device; and a processor coupled to the storage device, wherein the processor is adapted to execute instructions to:

storing a first record in a computer database representing a first transaction and having a supply quantity associated therewith;

storing a second record in the computer database representing a second transaction and having a consumption quantity associated therewith;

forming a first association link record storing a first association quantity representing a portion of the supply quantity from the first record to be assigned to a first portion of the consumption quantity of the second record; and during processing of the second record:

creating, by the database system, a third record in the computer database representing a second portion of the consumption quantity that has been processed by a third transaction, creating, by the database system, a second association link record storing a second association quantity representing a portion of the first association quantity to be assigned to the third record and representing whether the portion was assigned from the supply quantity or the consumption quantity, and adjusting, by the database system, the first association link record to represent an original first association quantity and a current first association quantity after the assignment to the third record.

7. The system of claim 6, wherein the first association link record includes sub-records representing original first association quantity, current first association quantity, transfer from supply side quantity, and transfer from consumption side quantity.

8. The system of claim 6, wherein the adjusting comprises reducing, by the database system, the first association quantity by the quantity assigned to the third record.

9. The system of claim 6, wherein the third record is a child record of the second record.

10. The system of claim 6, wherein the third record is a child record of the first record.

11. A computer readable medium including instructions adapted to execute a method of managing a computer database, the method comprising:

storing, by a database system, a first record in the computer database representing a first transaction and having a supply quantity associated therewith;

storing, by the database system, a second record in the computer database representing a second transaction and having a consumption quantity associated therewith;

forming, by the database system, a first association link record storing a first association quantity representing a portion of the supply quantity from the first record to be assigned to a first portion of the consumption quantity of the second record; and during processing of the second record:

creating, by the database system, a third record in the computer database representing a second portion of the consumption quantity that has been processed by a third transaction, creating, by the database system, a second association link record storing a second association quantity representing a portion of the first association quantity to be assigned to the third record and representing whether the portion was assigned from the supply quantity or the consumption quantity, and adjusting, by the database system, the first association link record to represent an original first association quantity and a current first association quantity after the assignment to the third record.

12. The computer readable medium of claim 11, wherein the first association link record includes sub-records representing original first association quantity, current first association quantity, transfer from supply side quantity, and transfer from consumption side quantity.

13. The computer readable medium of claim 11, wherein the adjusting comprises reducing, by the database system, the first association quantity by the quantity assigned to the third record.

14. The computer readable medium of claim 11, wherein the third record is a child record of the second record.

15. The computer readable medium of claim 11, wherein the third record is a child record of the first record.

* * * * *

UNITED STATES PATENT AND TRADEMARK OFFICE
CERTIFICATE OF CORRECTION

| | |
|---|---|
| PATENT NO. | : 7,664,772 B2 |
| APPLICATION NO. | : 10/740632 |
| DATED | : February 16, 2010 |
| INVENTOR(S) | : Edelmann et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1529 days.

Signed and Sealed this

Thirtieth Day of November, 2010

David J. Kappos
*Director of the United States Patent and Trademark Office*